(12) United States Patent
Barsoum et al.

(10) Patent No.: US 8,391,467 B2
(45) Date of Patent: Mar. 5, 2013

(54) METHODS AND SYSTEMS FOR ENCODING AND DECODING AUDIO SIGNALS

(75) Inventors: Yousri Barsoum, Manchester, MO (US); Michael S. Gramelspacher, Greenfield, IL (US); Rory T. Sledge, O'Fallon, IL (US)

(73) Assignee: Koplar Interactive Systems International L.L.C., St. Louis, MO (US)

( * ) Notice: Subject to any disclaimer, the term of this patent is extended or adjusted under 35 U.S.C. 154(b) by 381 days.

(21) Appl. No.: 12/731,949

(22) Filed: Mar. 25, 2010

(65) Prior Publication Data

US 2010/0248687 A1    Sep. 30, 2010

Related U.S. Application Data

(60) Provisional application No. 61/163,349, filed on Mar. 25, 2009.

(51) Int. Cl.
*H04M 1/00* (2006.01)

(52) U.S. Cl. .............. 379/353; 379/355.02; 379/355.03; 379/355.04; 379/355.09; 379/355.1

(58) Field of Classification Search ........ 379/351–355.1
See application file for complete search history.

(56) References Cited

U.S. PATENT DOCUMENTS

| | | | |
|---|---|---|---|
| 6,497,604 B2 * | 12/2002 | Fong et al. | 446/297 |
| 2002/0077028 A1 * | 6/2002 | Nishimoto | 446/484 |
| 2002/0141552 A1 * | 10/2002 | Fushimi | 379/93.28 |
| 2004/0081078 A1 * | 4/2004 | McKnight et al. | 370/210 |
| 2005/0243872 A1 * | 11/2005 | Monai | 370/525 |

* cited by examiner

*Primary Examiner* — Joseph J Nguyen
(74) *Attorney, Agent, or Firm* — Christopher R. Carroll; The Small Patent Law Group LLC

(57) ABSTRACT

Methods and systems for encoding and decoding audio signals are described. In one embodiment, a first DTMF tone in an audio signal may be identified and decoded. A second DTMF tone in the audio signal may be identified and decoded at a time delay from the first DTMF tone. A requested action is determined for an electronic figurine associated with the first DTMF tone and the second DTMF tone. The second DTMF tone is different than the first DTMF tone. Additional methods and systems are disclosed.

17 Claims, 12 Drawing Sheets

1200

METHODS AND SYSTEMS FOR ENCODING AND DECODING AUDIO SIGNALS

CROSS-REFERENCE TO A RELATED APPLICATION

This application claims the benefit of United States Provisional patent application entitled "Methods and Systems for Encoding and Decoding Audio Signals", Ser. No. 61/163,349, filed 25 Mar. 2009, the entire contents of the applications are herein incorporated by reference.

FIELD

This application relates to methods and systems for signal processing, and more specifically to methods and systems for encoding and decoding audio signals.

DETAILED DESCRIPTION

Example methods and systems for encoding and decoding audio signals are described. In the following description, for purposes of explanation, numerous specific details are set forth in order to provide a thorough understanding of example embodiments. It will be evident, however, to one of ordinary skill in the art that embodiments of the invention may be practiced without these specific details.

Figure 1:
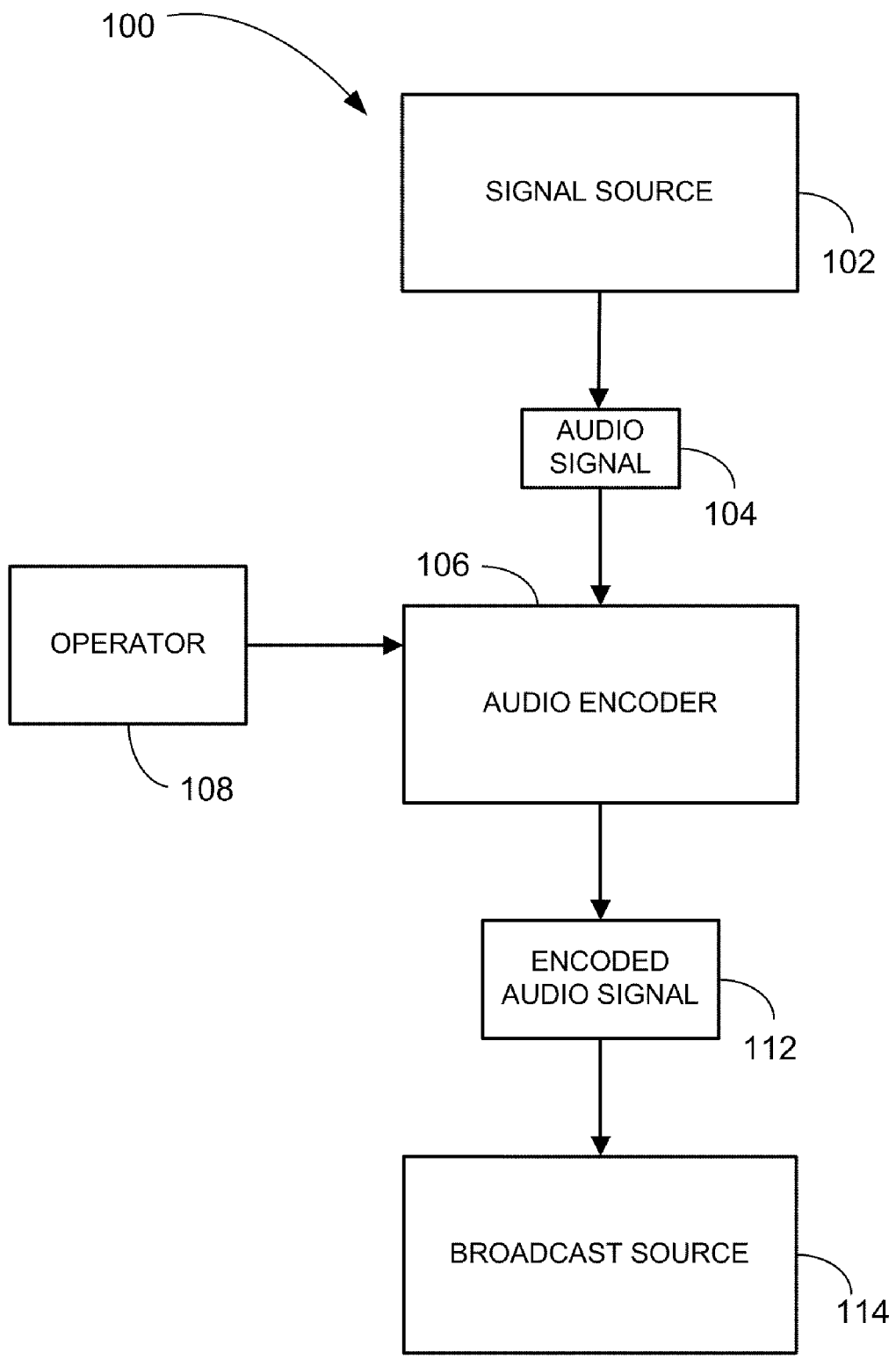
FIG. 1 is a block diagram of an example encoding system, according to an example embodiment.

FIG. 1 illustrates an example encoding system 100. The encoding system 100 is an example platform in which one or more embodiments of an encoding method may be used. However, the encoding may also be performed on other platforms.

An audio signal 104 may be provided from a signal source 102 to an audio encoder 106 in the encoding system 100. The audio signal 104 may be in digital or analog format. In some embodiments, the audio signal 104 is a portion of a video signal that includes standard definition (SD) and/or high definition (HD) content signals in NTSC (National Television Standards Committee), PAL (Phase Alternation Line), SECAM (Systeme Electronique Couleur Avec Memoire), a MPEG (Moving Picture Experts Group) signal, a sequence of JPEGs (Joint Photographic Experts Group), a sequence of bitmaps, or other signal formats that transport of a sequence of images. The form of the audio signal 104 may be modified to enable implementations involving various formats and qualities.

The signal source 102 is a unit that is capable of providing and/or reproducing audio electrically in the form of the audio signal 104. The signal source 102 may be a computer with a hard drive and appropriate sound functionality, digital audio tape (DAT) player with a DAT, a tape player with a cassette tape, a compact disc (CD) player with a CD, or the like. Examples of the signal source 102 when the audio signal 104 is a part of a video signal include a professional grade video tape player with a video tape, a camcorder, a video file server, a computer with an output port, a digital versatile disc (DVD) player with a DVD disc, and the like. The signal source 102 may provide the audio signal 104 through a transmission or otherwise. In one embodiment, the signal source 102 and the audio encoder 106 are integrated into a single device. In another embodiment, the signal source 102 and the audio encoder 106 are separate devices.

An operator 108 may interact with the audio encoder 106 to control its operation to encode dual-tone multi-frequency tones (DTMF), a data trigger on a subcarrier of a frequency (e.g., Radio Broadcast Data System (RBDS)), or both in the audio signal 104. The encoding produces an encoded audio signal 112 that may be provided to a broadcast source 114. In an example embodiment, the operator 108 may include a person that interacts with the audio encoder 106 through the use of a computer or other electronic control device. The operator 108 may consist entirely of hardware, firmware, and/or software, or other electronic control device that directs operation of the audio encoder 106 in an automated manner.

The encoded audio signal 112 may be provided to the broadcast source 114 for distribution and/or transmission to an end-user who may listen to the audio content associated with the encoded audio signal 112. The broadcast source 114 may deliver the encoded audio signal 112 to one or more listeners in formats including analog and/or digital audio or video by storage medium such as DVD, tapes, and other fixed medium and/or by transmission sources such as television broadcast stations, cable, satellite, wireless and Internet sources that broadcast or otherwise transmit content. The encoded audio signal 112 may be encoded at the broadcast source 114 prior to delivering the encoded audio signal 112 to the one or more listeners. Additional encoding (e.g., MPEG encoding) may occur at the audio encoder 106, the broadcast source 114, or anywhere else in the production chain after encoding.

Figure 2:
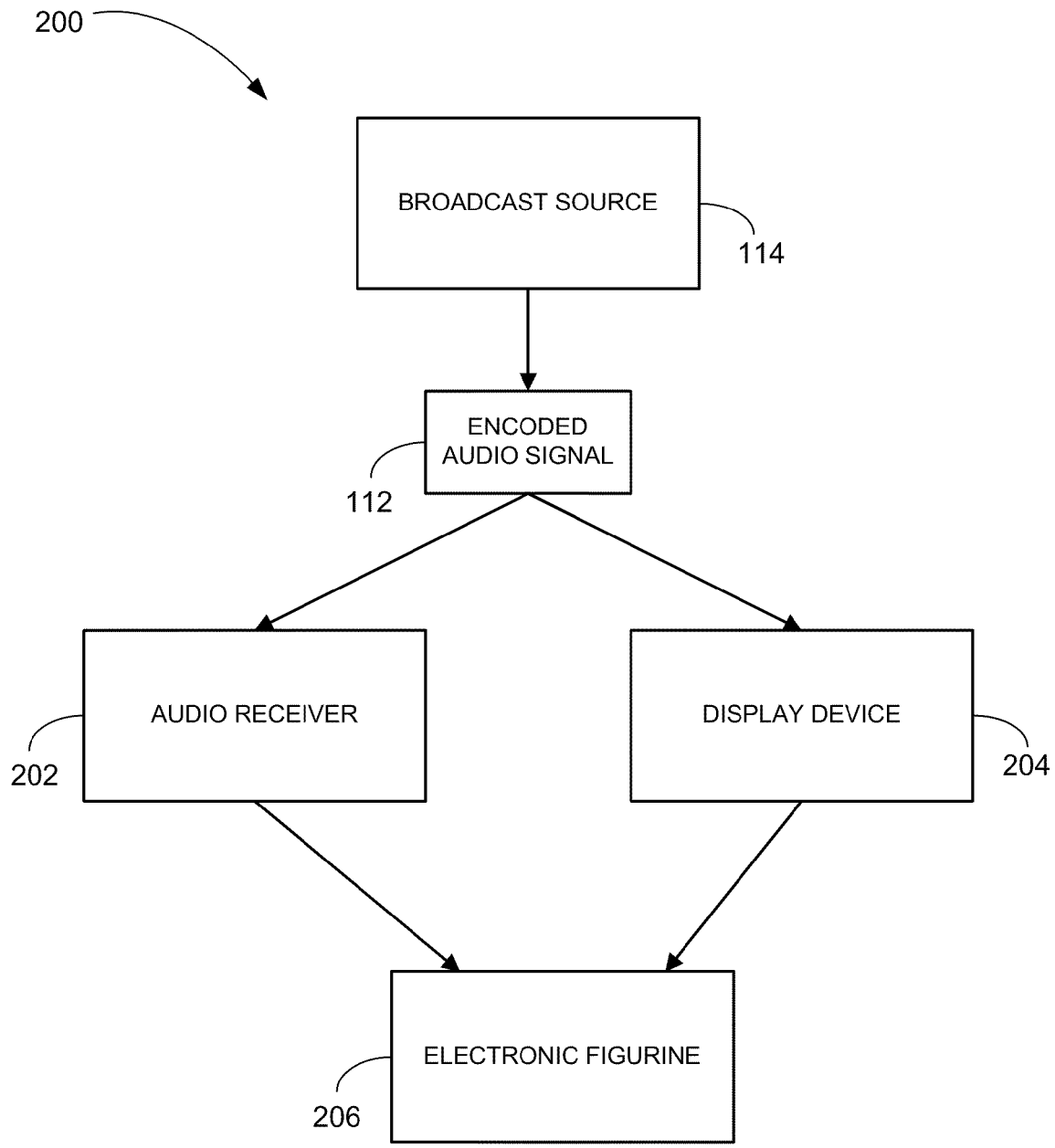
FIG. 2 is a block diagram of an example decoding system, according to an example embodiment.

FIG. 2 illustrates an example decoding system 200. The decoding system 200 is an example platform in which one or more embodiments of a decoding method may be used. However, the decoding may also be performed on other platforms.

The detection system 200 may send the encoded audio signal 112 from the broadcast source 114 (see FIG. 1) to an audio receiver 202 and/or a display device 204. The audio receiver 202 may receive an audio transmission from the broadcast source 114 that includes the encoded audio signal 112, while the display device 204 may receive a video transmission from the broadcast source 114 that includes the encoded audio signal 112. The encoded audio signal 112 may, in some embodiments, be distributed without transmission (e.g., in the form of a CD or DVD) to the audio receiver 202, the display device 204, or both.

Examples of the audio receiver 202 include a portable radio player, a stereo receiver, a computer radio player, or the like. Examples of the display device 204 includes projection televisions, plasma televisions, liquid crystal displays (LCD), personal computer (PC) screens, digital light processing (DLP), stadium displays, digital recorders (e.g., digital video recorders (DVRs)), devices that may incorporate displays such as toys and personal electronics, and the like.

The electronic figurine 206, when positioned in proximity to the audio receiver 202, the display device 204, or both, receives the encoded audio signal 112 and seeks to detect encoded DTMF tones, an encoded data trigger on a subcarrier of a frequency, or both. The electronic figurine 206 may receive the encoded audio signal 112 through the use of an integrated microphone, a radio frequency receiver, or both. When certain encoded DTMF tones, the encoded data trigger, or both are decoded, the electronic figurine 206 may perform one or more actions.

Figure 3:
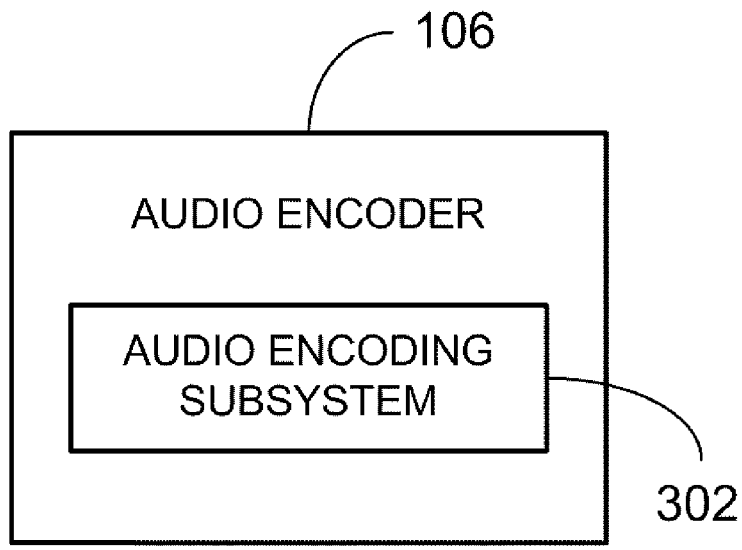
FIG. 3 is a block diagram of an example audio encoder that may be deployed within the encoding system of FIG. 1, according to an example embodiment.

FIG. 3 illustrates an example audio encoder 106 that may be deployed in the encoding system 100 (see FIG. 1), or otherwise deployed in another system. The audio encoder 106 is shown to include an audio encoding subsystem 302 to encode the audio signal 104 with multiple DTMF tones, an encoded data trigger on a subcarrier of a frequency, or both to create the encoded audio signal 112.

Figure 4:
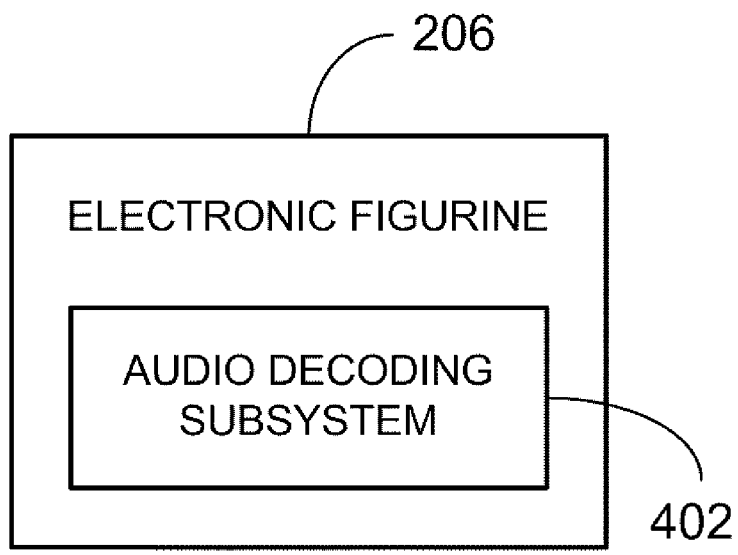
FIG. 4 is a block diagram of an example electronic figurine that may be deployed within the decoding system of FIG. 2, according to an example embodiment.

FIG. 4 illustrates an example electronic figurine 206 that may be deployed in the decoding system 200 (see FIG. 1), or otherwise deployed in another system. The electronic figurine 206 is shown to include an audio decoding subsystem 402 to decode multiple DTMF tones within the encoded audio signal 112, an encoded data trigger on a subcarrier of a frequency of an audio signal (e.g., the encoded audio signal 112 or a different audio signal), or both.

In some embodiments, the audio decoding subsystem 402 includes an 8-bit speech CPU such as a Winbond W588D040. However, other numbers of bits, non-speech CPUs, and/or different brands of CPU may also be used.

In some embodiments, a microphone is included with the audio decoding subsystem 402. The microphone may be a small condenser microphone such as a Horn EM 6027. However, other types of microphone and/or brands of microphones may also be used.

In some embodiments, the chip of the audio decoding subsystem 402 is DTMF CPU such as a Holtek HT9172. In some embodiments, digital filtering and digital processing is performed on a separate CPU or combined onto the same CPU.

In some embodiments, the audio decoding subsystem 402 includes a radio frequency receiver to receive audio signals at a single frequency or over a number of different frequencies based on frequency selection.

The audio decoding subsystem 402 is shown to be included in the electronic figurine 206 in one embodiment. In other embodiments, the audio decoding subsystem 402 may be deployed in other types of mobile electronic devices including mobile phones, gaming devices, personal digital assistants, and the like.

Figure 5:
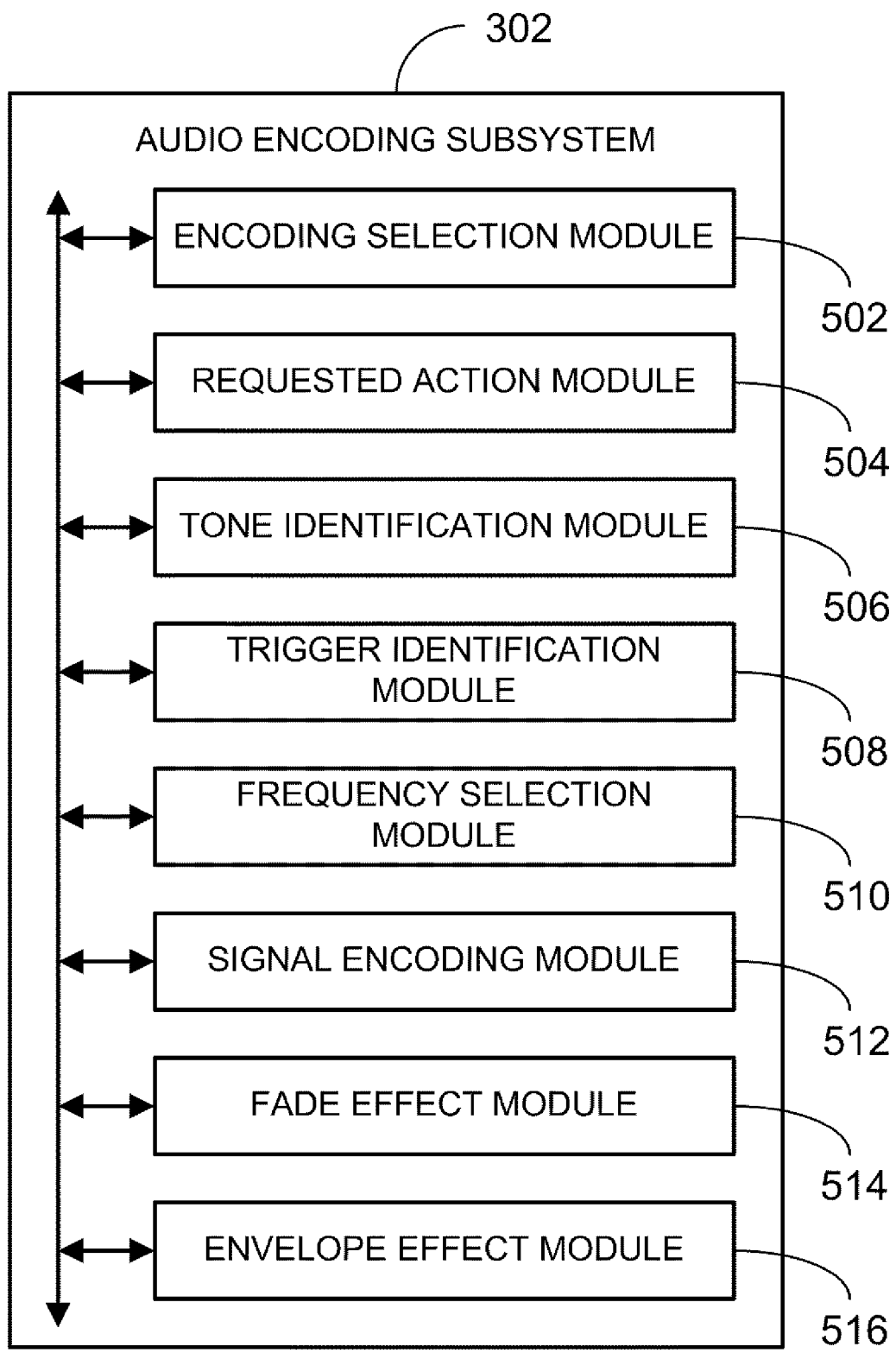
FIG. 5 is a block diagram of an example audio encoding subsystem that may be deployed within the audio encoder of FIG. 3, according to an example embodiment.

FIG. 5 illustrates an example audio encoding subsystem 302 that may be deployed in the audio encoder 106, or otherwise deployed in another system. One or more modules are included in the audio encoding subsystem 302 to enable encoding of DTMF tones, the data trigger on the subcarrier of the frequency, or both in the audio signal 104. The modules of the audio encoding subsystem 302 that may be included are an encoding selection module 502, a requested action module 504, a tone identification module 506, a trigger identification module 508, a frequency selection module 510, a signal encoding module 512, a fade effect module 514, and an envelope effect module 516. Other modules may also be included.

In general, multiple DTMF tones are selected for encoding. In some embodiments, the encoding selection module 502 receives a two-tone encoding selection associated with an action on the electronic figurine 206. The two-tone encoding selection includes selection of a first DTMF tone and a second DTMF tone.

In other embodiments, the requested action module 504 receives a requested action for the electronic figurine 206 and the tone identification module 506 identifies the first DTMF tone and the second DTMF tone. The requested action may include, by way of example, an audio reproduction request, a motion request, or a light request for the electronic figurine 206.

A first portion of the audio signal 104 is encoded with the first DTMF tone by the signal encoding module 512. The signal encoding module 512 also encodes a second portion of the audio signal 104 with the second DTMF tone at a time delay from the first DTMF tone to create the encoded audio signal 112. The second DTMF tone in the encoded audio signal 112 is a different tone than the first DTMF tone. The time duration of the first portion and the second portion in the encoded audio signal 112 may be approximately equal, or may be different. The encoding of the first portion and the second portion may be performed based on the two-tone encoding selection received by the encoding selection module 502, the identification performed by the tone identification module 506, or may be otherwise performed.

In some embodiments, the time delay between the first DTMF tone and the second DTMF tone is less than a quarter of a second. In other embodiments, the time delay is greater than a quarter of a second but less than a second. In still other embodiments, the time delay is a second or greater than a second.

Prior to the encoding by the signal encoding module 512, one or more modules may perform audio processing on the first and second DTMF tones to reduce the audibility of the DTMF tones in the underlying audio of the encoded audio signal 112, to increase the delectability of the first and second DTMF tones, or both.

An example module that may perform audio processing on the first and second DTMF tones is the fade effect module 514. In general, a fade effect is a gradual change in sound volume. The fade effect performed by the fade effect module 514 may include a fade in, a fade out, or both. The fade effect module 514 may also perform other types of fades.

The fade effect module 514 applies a fade effect to the first and second DTMFs tone to create a first faded DTMF tone and a faded second DTMF tone. The first portion of the audio signal is then encoded by the signal encoding module 512 with the first faded DTMF tone and the second portion of the audio signal is encoded by the signal encoding module 512 with the faded second DTMF tone at the time delay.

Another example module that may perform audio processing on the first and second DTMF tones is the envelope effect module 516. The envelope effect module 516 applies an envelope effect (e.g., an envelope filter) to the first and second DTMFs tone to create an enveloped first DTMF tone and an enveloped second DTMF tone. The first portion of the audio signal 104 is then encoded by the signal encoding module 512 with the enveloped first DTMF tone and the second portion of the audio signal 104 is encoded by the signal encoding module 512 with the enveloped second DTMF tone at the time delay to create the encoded audio signal 112.

The DTMF tones may be encoded in a portion of the audio signal 104 by the signal encoding module 512 based on underlying audio of the audio signal 104. For example, DTMF tones in certain portions of the audio may be more easily detectable than other portions of the audio.

More than two DTMF tones may be encoded into the audio signal 104. For example, a third DTMF tone that is different from the second DTMF tone may be encoded into the audio signal 104 at the time delay (or a different time delay) from the second DTMF tone by the signal encoding module 512.

In some embodiments, the requested action module 504 receives a requested action for the electronic figurine 206 and a data trigger is identified by the trigger identification module 508 based on the requested action received by the requested action module 504. In general, the data triggers are used to trigger data that is prestored (e.g., before receipt of the encoded audio signal 112) on the electronic figurine 206. The stored data that is triggered may cause the electronic figurine 206 to perform an action (e.g., reproduce a sound stored in the data).

The frequency selection module 510 identifies a frequency for encoding. The frequency may be identified by the frequency selection module 510 through receive a user selection of a frequency, automatic selection from among a number of frequencies, or the frequency may be otherwise selected.

Figure 6:
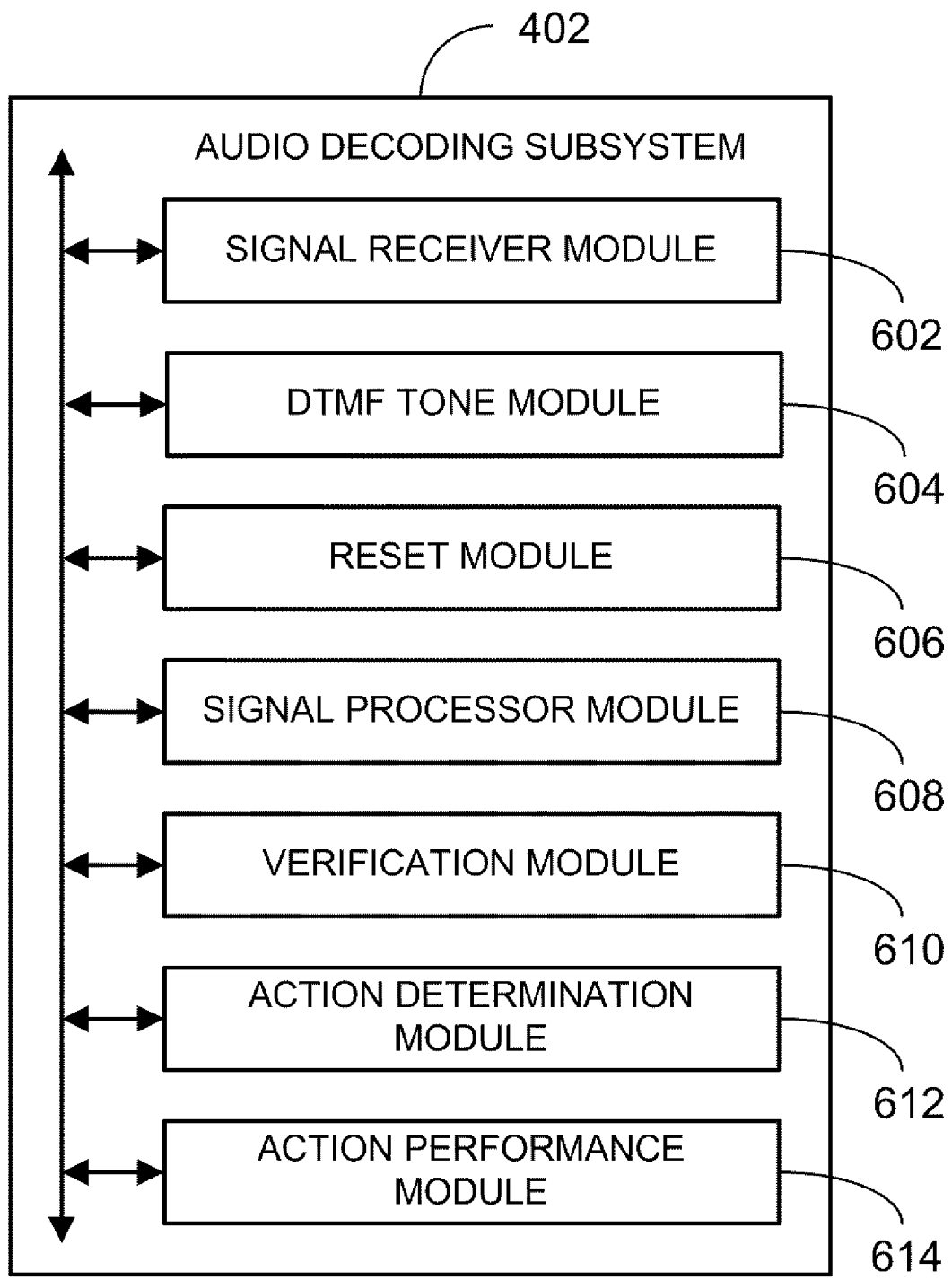
FIG. 6 is a block diagram of an example audio decoding subsystem that may be deployed within the electronic figurine of FIG. 4, according to an example embodiment.

The signal encoding module 512 creates the encoded audio signal 112 by encoding the data trigger within a subcarrier of the frequency of the audio signal 104. The signal encoding module 512 may encode the encoded audio signal 112 with, by way of example, with DTMF tones, the data trigger, or both, FIG. 6 illustrates an example audio decoding subsystem 402 that may be deployed in the electronic figurine 206, or otherwise deployed in another system. One or more modules are included in the audio decoding subsystem 402 to enable decoding of the encoded DTMF tones, the encoded data trigger, or both in the encoded audio signals 112. The modules of the audio decoding subsystem 402 that may be included are a signal receiver module 602, a DTMF tone module 604, a reset module 606, a signal processor module 608, a verification module 610, an action determination module 612, and an action performance module 614. Other modules may also be included.

The signal receiver module 602 receives the encoded audio signal 112. To determine the DTMF tones that are encoded in the encoded audio signal 112, the DTMF tone module 604 identifies and decodes the first DTMF tone in the encoded audio signal 112. The audio decoding subsystem 302 then, in some embodiments, attempts to identify and decode a further DTMF tone in the encoded audio signal 112 after a delay of a period of time. The time delay may be preset and fixed on the electronic figurine 206, may be variable based on certain circumstances (e.g., current time, number of detected attempts, or the like), or may be otherwise set and/or calculated on the electronic figurine 206.

After the time delay, the DTMF tone module 604 attempts to identify and decode the second DTMF tone in the encoded audio signal 112 at the time delay from the first DTMF tone.

For example, the first DTMF tone may have a value of 1, while the second DTMF tone may have a value of 6. The second DTMF tone that is decoded and identified is different from the first DTMF tone. In some embodiments, there is no DTMF tone in the audio signal between the first DTMF tone and the second DTMF during the time delay. If the attempt to identify and decode the second DTMF tone is unsuccessful, the reset module 606 may reset the electronic figurine 206 to enable a further attempt to identify and detect the first DTMF tone and the second DTMF tone at a time delay from the first DTMF tone.

The second DTMF tone may be identified and decoded by the DTMF tone module 602 by determining whether an additional DTMF tone is present in the encoded audio signal 112 at the time delay from the first DTMF tone and decoding the additional DTMF tone as the second DTMF tone.

Once the first and the second DTMF tones are identified and decoded by the DTMF tone module 604, the action determination module 612 determines the action for the electronic figurine 206 associated with the first DTMF tone and the second DTMF tone. The action may then be performed on the electronic figurine 206 by the action performance module 614. For example, the performance of the audio reproduction request causes the electronic figurine 206 to reproduce sound, the performance of the motion request causes the electronic figurine 206 to move parts, and the performance of the light request causes the electronic figurine 206 to display one or more lights.

In some embodiments, the determination of the action by the action determination module 612 includes comparing the first DTMF tone and the second DTMF tone to a number of paired tone entries of a lookup table. The lookup table associated a number of paired tune entries with various request actions. The action is then identified for the electronic figurine 206 by the action determination module 612 based on the comparison.

In some embodiments, the signal receiver module 602 receives a transmission of the encoded audio signal 112 at a frequency. In general, the transmission is received through the radio frequency receiver. The signal processor module 608 processes the encoded audio signal 112 to decode an encoded data trigger on a subcarrier of the frequency from the encoded audio signal 112.

The signal receiver module 602 audibly receives through a microphone an additional audio signal. The additional audio signal may be the encoded audio signal 112 (e.g., when tuned to a same frequency as the encoded audio signal) or a different audio signal (e.g., when tuned to a different frequency than the encoded audio signal).

The verification module 610 verifies the encoded data trigger based on receipt of the additional audio signal and the action determination module 612 enables an action based on verification of the encoded data trigger. The action performance module 614 may then perform the action based on enablement of the action and the encoded data trigger.

Figure 7:
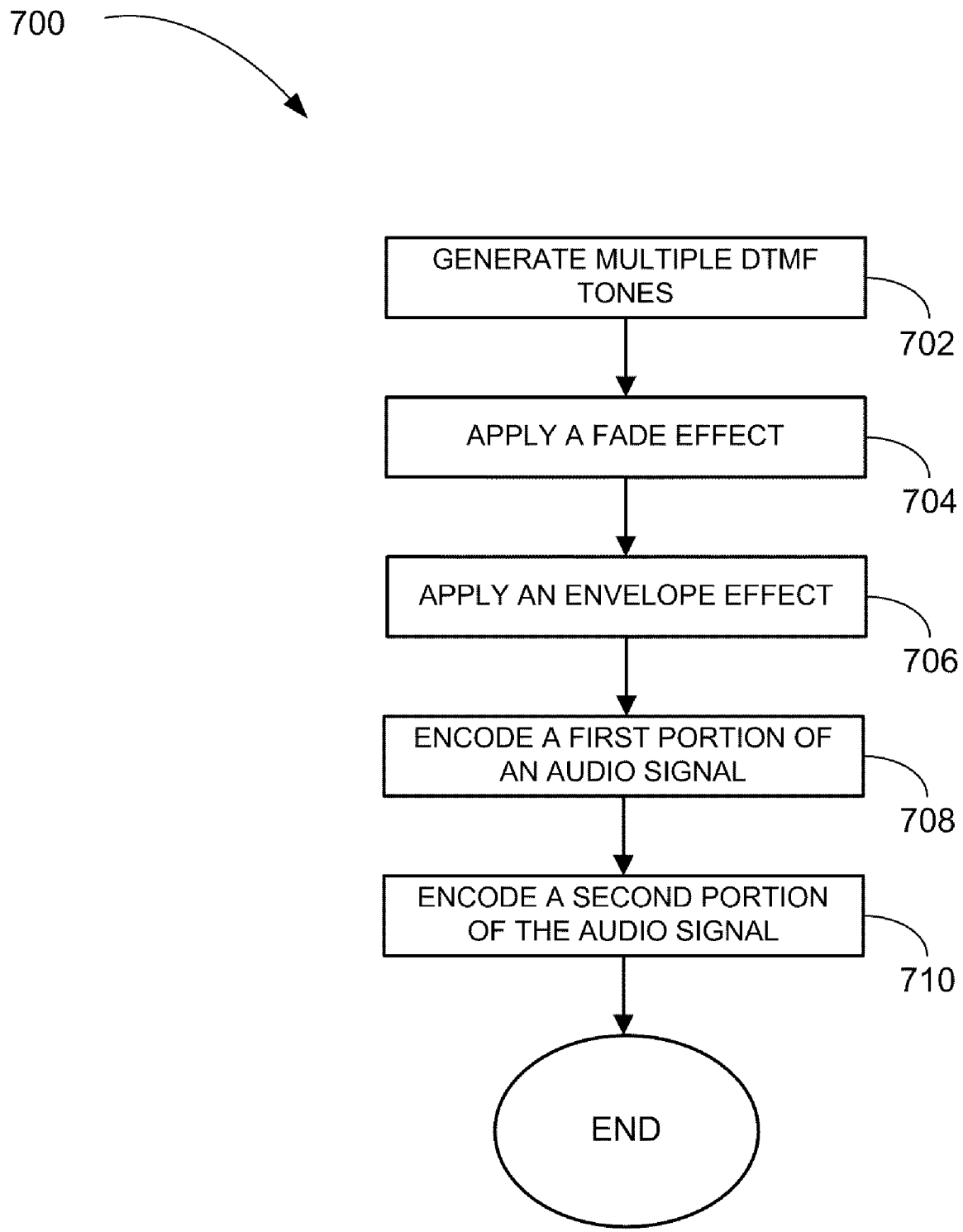
FIG. 7 is a block diagram of a flowchart illustrating a method for audio encoding, according to an example embodiment.

FIG. 7 illustrates a method 700 for audio encoding according to an example embodiment. The method 700 may be performed by the audio encoder 106 of the system 100 (see FIG. 1), or may be otherwise performed.

Multiple DTMF tones may be generated at block 702. In one embodiment, the DTMF tones are generated in response to receiving the two-tone encoding selection associated with one or more actions on the electronic figurine 206. The two-tone encoding selection may be received from the operator 108 (see FIG. 1), or may be otherwise received. In another embodiment, the DTMF tones are generated in response to receiving the requested action for the electronic figurine 206, and the first DTMF tone and the second DTMF tone are identified based on the requested action. The requested actions may include, by way of example, an audio reproduction request, a motion request, a light request, or combinations thereof for the electronic figurine 206.

In some embodiments, a fade effect is applied to the first DTMF tone and the second DTMF tone at block 704 to create a first faded DTMF tone and a faded second DTMF tone. The fade effect may first include a fade in that is followed by a fade out. Other types of fades may also be used.

In some embodiments, an envelope effect is applied to the first DTMF tone and the second DTMF tone at block 706 to create a first enveloped DTMF tone and a second enveloped DTMF tone.

A first portion of the audio signal 104 is encoded with the DTMF tone at block 708. In some embodiments, the DTMF tone that is encoded in the first portion is the first faded DTMF tone, the first enveloped tone, or the first enveloped faded DTMF tone.

A second portion of the audio signal 104 is encoded with the second DTMF tone at the time delay from the first DTMF tone at block 710. The second DTMF tone is different than the first DTMF tone. In some embodiments, the DTMF tone that is encoded in the second portion is the second faded DTMF tone, the second enveloped tone, or the second enveloped faded DTMF tone. The DTMF tones may be encoded in the portions of the audio signal 104 based on underlying audio of the audio signal. For example, the DTMFs may be less audible in certain portions of the audio signal 104 than other portions of the audio signal 104.

In some embodiments, additional DTMF tones beyond the second DTMF tone (e.g., a third DTMF tone) are encoded in the audio signal 104 at the time delay from a previous DTMF tone.

Figure 8:
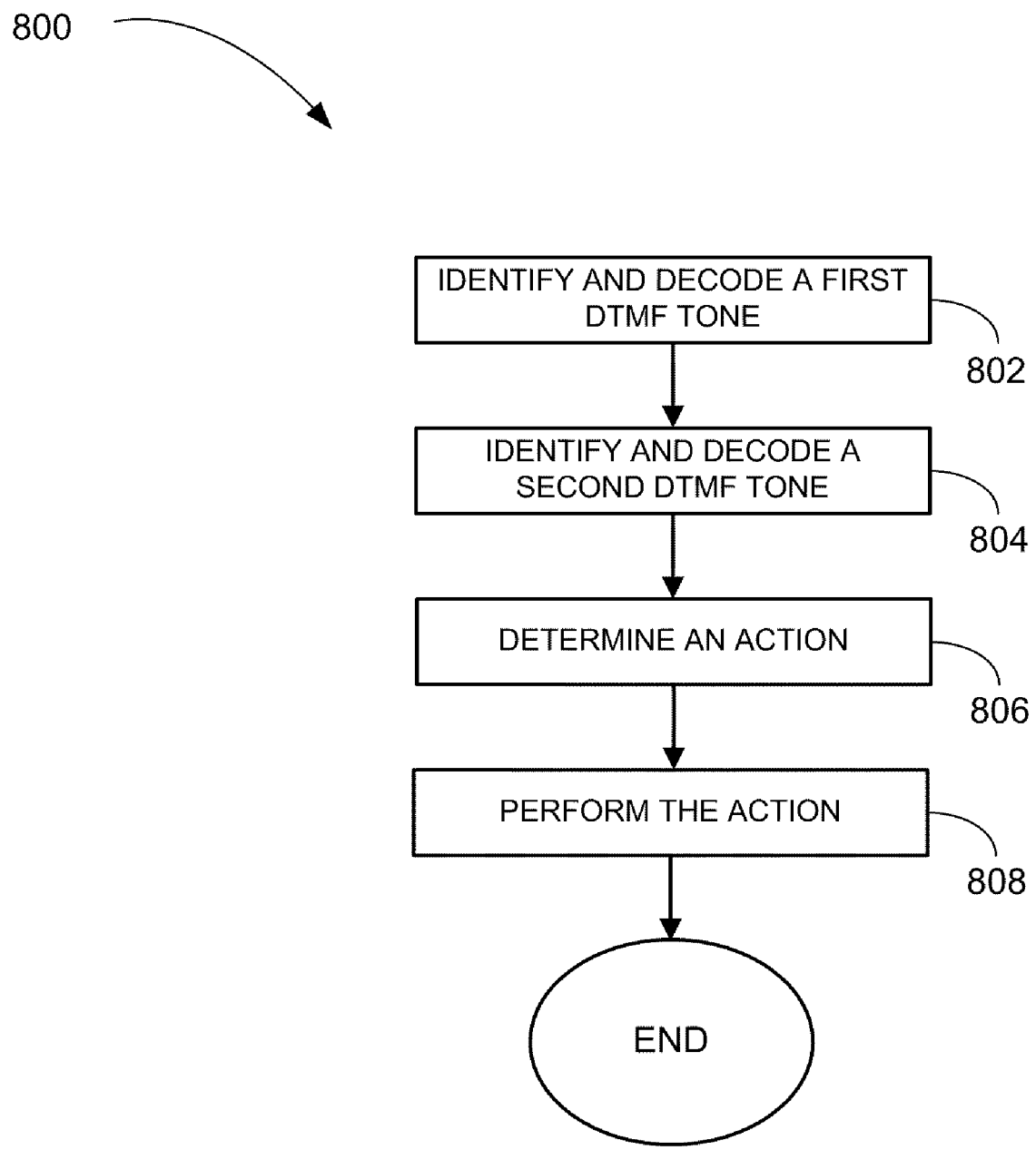
FIGS. 8 and 9 are block diagrams of flowcharts illustrating methods for audio decoding, according to example embodiments.

FIG. 8 illustrates a method 800 for audio decoding according to an example embodiment. The method 800 may be performed by the electronic figurine 206 of the decoding system 200 (see FIG. 1), or may be otherwise performed.

The first DTMF tone is identified and decoded in the encoded audio signal 112 at block 802. The second DTMF tone is then identified and decoded in the encoded audio signal 112 at the time delay from the first DTMF tone at block 804.

In some embodiments, the second DTMF tone is identified and decoded by determining whether an additional DTMF tone is present in the encoded audio signal 112 at the time delay from the first DTMF tone and decoding the additional DTMF tone as the second DTMF tone.

The action associated with the first DTMF tone and the second DTMF is determined for an electronic figurine 208 at block 806. For example, the first DTMF tone and the second DTMF tone may be compared to a number of paired tone entries of the lookup table and the action for the electronic figurine 206 may be identified based on the comparison. The action may then be performed on the electronic figurine at block 808.

Figure 9:
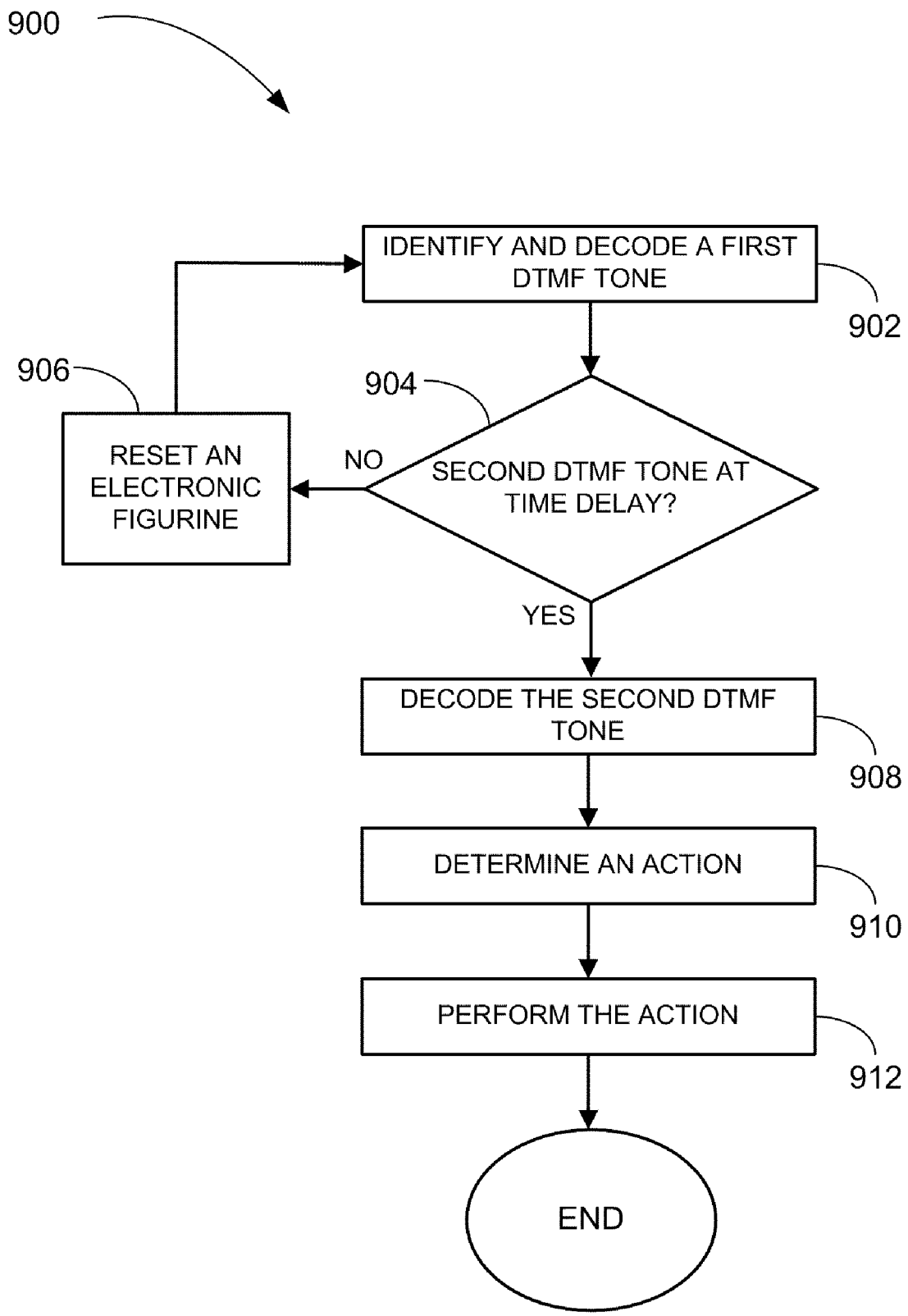

FIG. 9 illustrates a method 900 for audio decoding according to an example embodiment. The method 900 may be performed by the electronic figurine 206 of the decoding system 200 (see FIG. 1), or may be otherwise performed.

The first DTMF tone is identified and decoded in the encoded audio signal 112 at block 902. A determination of whether the second DTMF tone is present in the encoded audio signal 112 at the time delay from the first DTMF tone is made at decision block 904. If a determination is made that the second DTMF tone is not present in the encoded audio signal 112 at the time delay from the first DTMF tone, the electronic figurine 206 is reset to receive additional DTMF tones at block 906 and the method returns to block 902 to identify and decode another first DTMF tone. If a determination is made that the second DTMF tone is present in the encoded audio signal 112 at the time delay from the first DTMF tone at decision block 904, the second DTMF tone is decoded at block 908.

The requested action associated with the first DTMF tone and the second DTMF tone is determined for an electronic figurine 206 at block 910. The requested action may be performed by the electronic figurine 206 at block 912.

Figure 10:
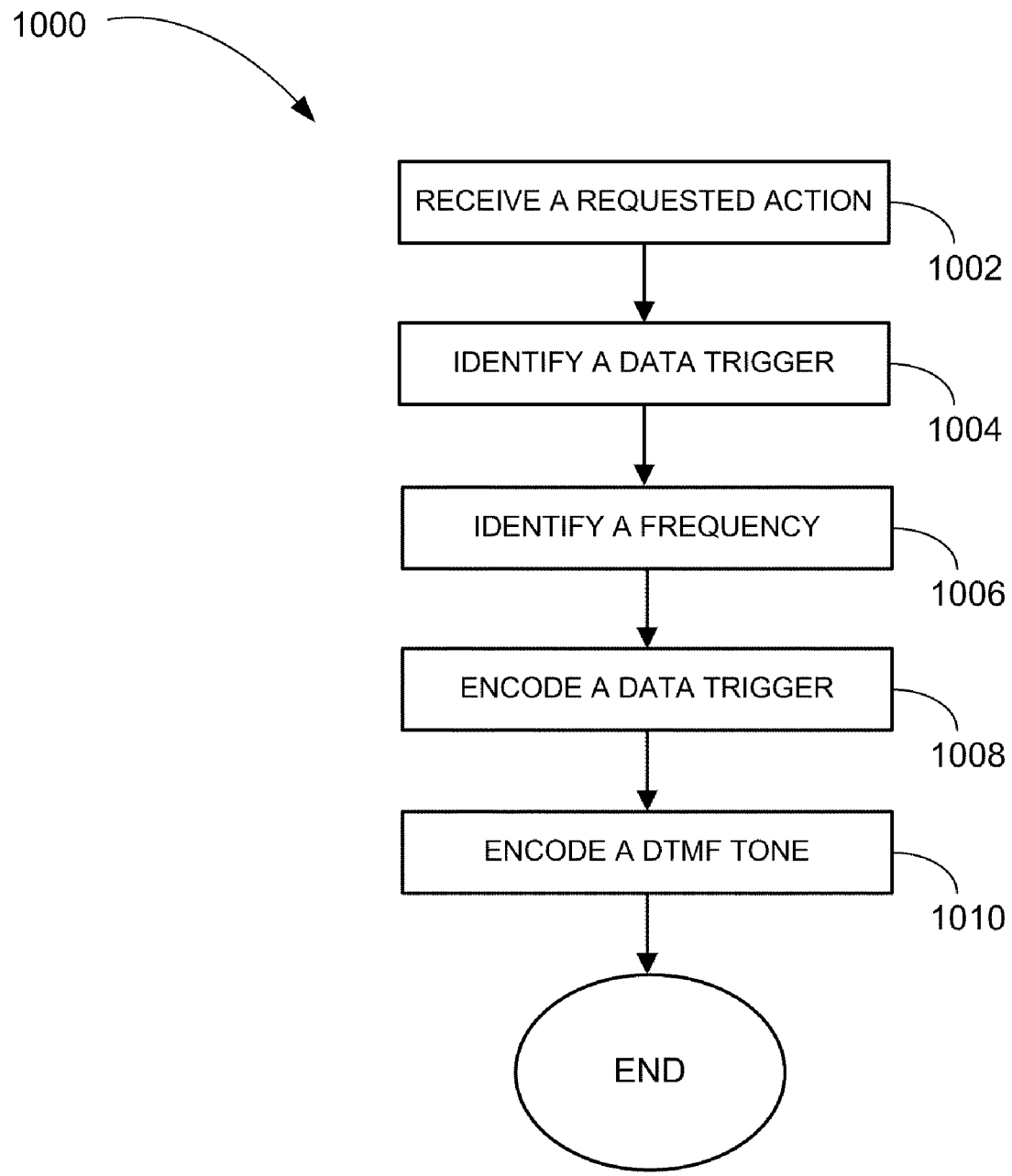
FIG. 10 is a block diagram of a flowchart illustrating a method for audio encoding, according to an example embodiment.

FIG. 10 illustrates a method 1000 for audio encoding according to an example embodiment. The method 1000 may be performed by the audio encoder 106 of the system 100 (see FIG. 1), or may be otherwise performed.

In some embodiments, a requested action is received for the electronic figurine 206 at block 1002.

A data trigger is identified at block 1004 based on the requested action received. In general, the data trigger is used to trigger stored data on the electronic figurine 206. For example, the data trigger may be used to trigger selected portions of the data stored on the electronic figurine 206 that enable the electronic figurine 206 to perform a certain action or actions (e.g., reproduce a sound stored in the data).

A frequency is identified for encoding at block 1006. The frequency may be identified by user selection, automatic selection from among a number of frequencies, or may be preset.

A data trigger is encoded within a subcarrier of the frequency of the audio signal 104 at block 1008.

In some embodiments, the audio signal is encoded with a DTMF tone or multiple DTMF tones at block 1010.

Figure 11:
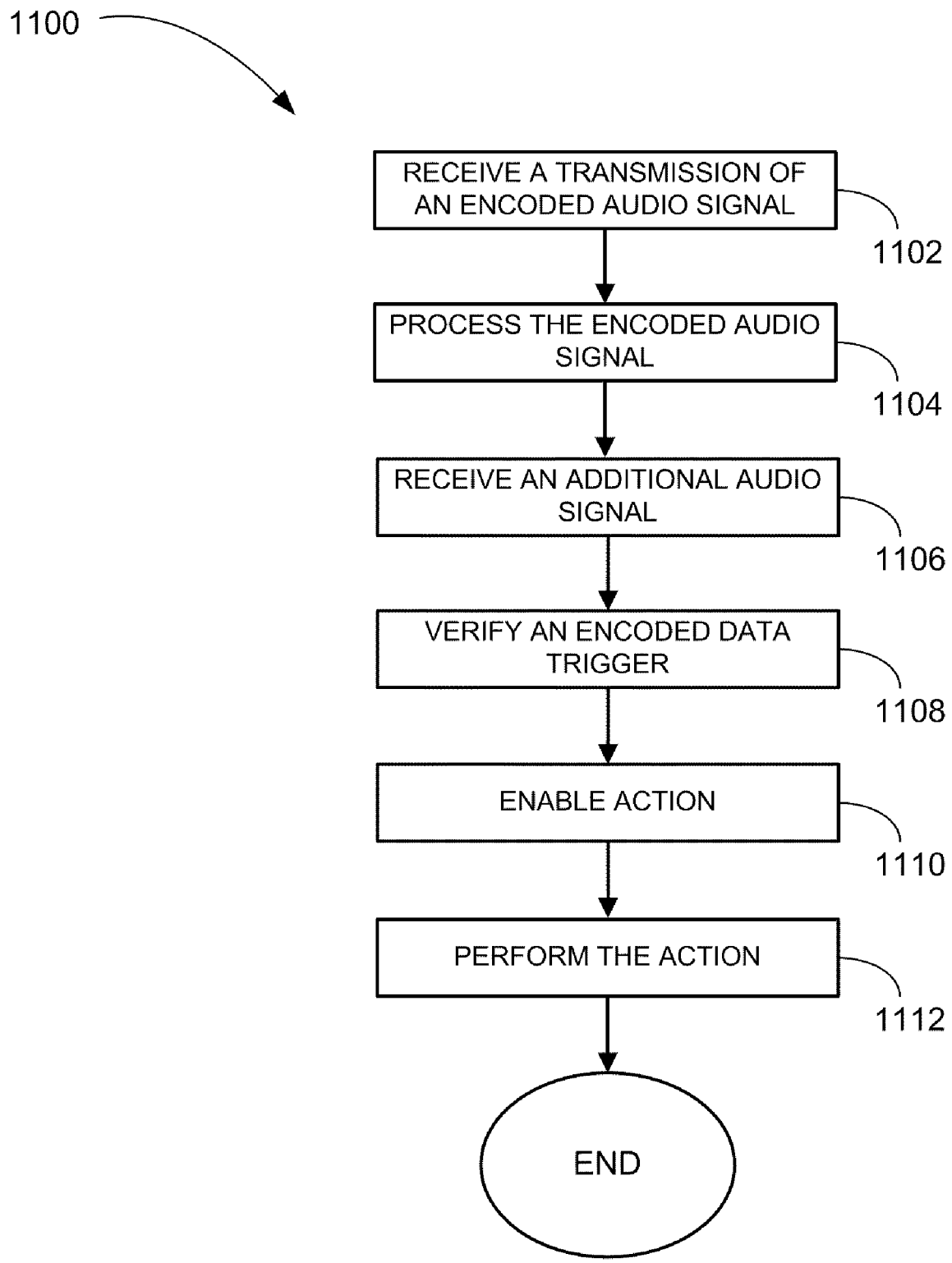
FIG. 11 is a block diagram of a flowchart illustrating a method for audio decoding, according to an example embodiment.

FIG. 11 illustrates a method 1100 for audio decoding according to an example embodiment. The method 1100 may be performed by the electronic figurine 206 of the decoding system 200 (see FIG. 1), or may be otherwise performed. The method 1100 may use multiple sources (e.g., DTMF tones and a data trigger) to enable actions on an electronic figurine 206.

A transmission of the encoded audio signal 112 is received at a frequency through a radio frequency receiver at block 1102. In some embodiments, the electronic figurine 206 is automatically tuned to the frequency on which the transmission is received. In some embodiments, a user frequency selection is received and the electronic figurine 206 is tuned based on receipt of the user frequency selection. The electronic figurine 206 may be set to a specific frequency at which the transmission is received. The electronic figurine 206 may otherwise be tuned to receive the frequency.

The encoded audio signal is processed at block 1104 to decode an encoded data trigger on a subcarrier of the frequency from the encoded audio signal 112. The subcarrier may be Radio Broadcast Data System (RBDS) subcarrier or Radio Data System (RDS) subcarrier, or a different type of subcarrier.

An additional audio signal is audibly received through a microphone at block 1106. The additional audio signal may be the encoded audio signal 112, or a different audio signal. The additional audio signal may be received at the same time as the encoded audio signal 112 (e.g., being the same signal or a different signal), before the encoded audio signal 112 is received, or after the encoded audio signal 112 is received.

At block 1108, the encoded data trigger is verified based on receipt of the additional audio signal. In some embodiments, verification is performed by identifying source identifying content of the encoded audio signal 112 using audio fingerprinting, identifying a content source based on the source identifying content, and, determining that the content source is an approved source. The action may thereby be enabled based on a determination that the content source is the approved content source.

In some embodiments, verification is performed by identifying source identifying content of the encoded audio signal 112 using audio comparison against audio signal data pre-stored on the electronic figurine 206, identifying a content source based on the source identifying content, and determining that the content source is an approved source. The action may thereby be enabled based on a determination that the content source is the approved content source.

In some embodiments, the verification is performed by verifying the encoded data trigger with a single DTMF tone or multiple DTMF tones. For example, the encoded data trigger may be compared with DTMF tones to verify a match. The action may then be enabled based on the match.

An action is enabled at block 1110 based on verification. The action may be sound reproduction, light illumination, or the like.

In some embodiments, the action is performed at block 1112 based on enablement of the action and the encoded data trigger. In one embodiment, performing the action includes reproducing a stored audio signal.

Figure 12:
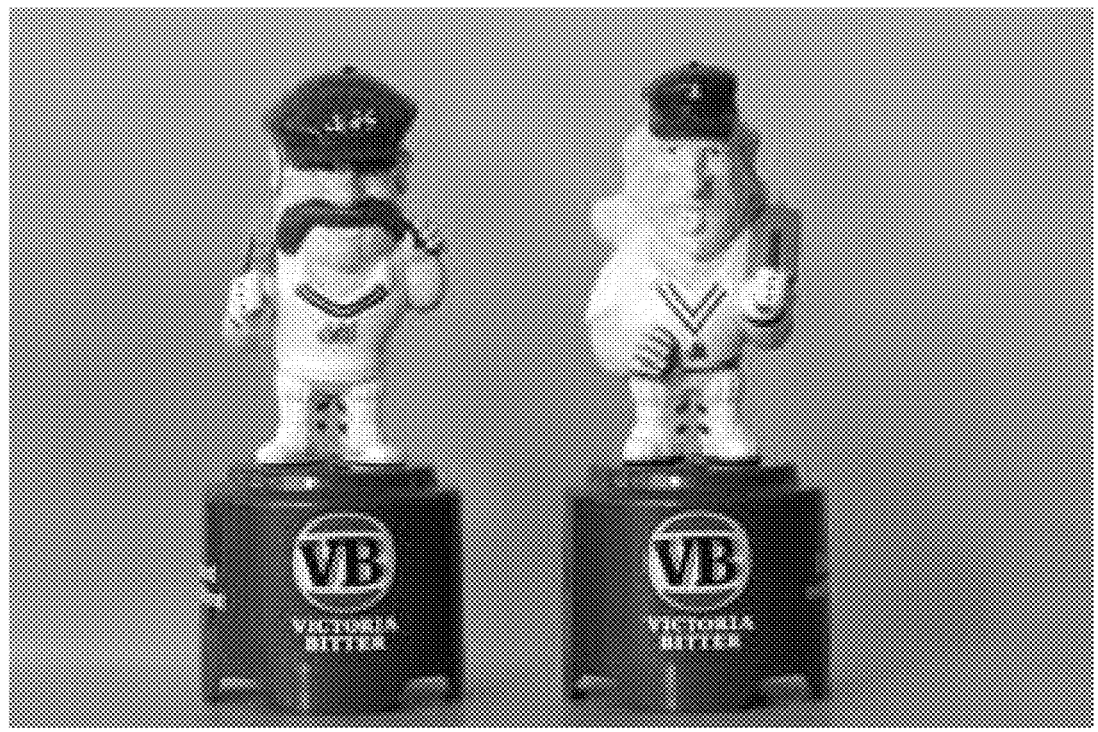
FIG. 12 is a diagram of example electronic figurines, according to an example embodiment.

FIG. 12 shows example electronic figurines 1200 according to example embodiments. The electronic figurine 206 may be one of the electronic figurines 1000, or may be in another form.

The figurines may represent persons, animals, objects, or the like. The shell of the electronic figurine may be configured so that it can be attached to the top of a beverage can. However, other types of figures may also be used for the figurine.

Figure 13:
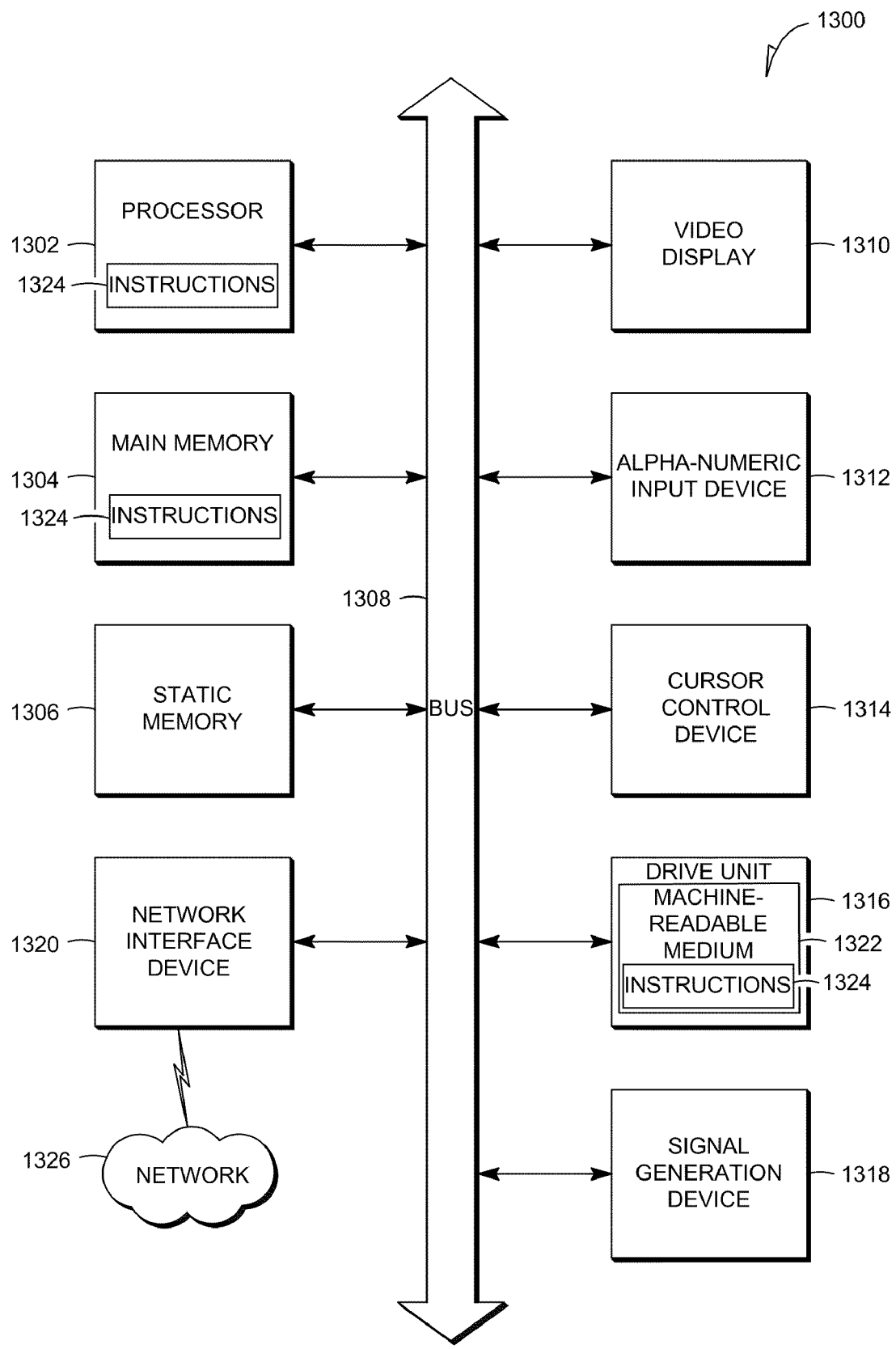
FIG. 13 is a block diagram of a machine in the example form of a computer system within which a set of instructions for causing the machine to perform any one or more of the methodologies discussed herein may be executed.

FIG. 13 shows a block diagram of a machine in the example form of a computer system 1300 within which a set of instructions may be executed causing the machine to perform any one or more of the methods, processes, operations, or methodologies discussed herein. The broadcast source 112 the signal source 102, or both may operate on one or more computer systems 1300. The audio encoder 106 the audio receiver 202, or the display device 204 of FIG. 1, the electronic figurine 206 of FIG. 2, or any of the foregoing may include the functionality of the one or more computer systems 1300.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1312 (e.g., a central processing unit (CPU) a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a cursor control device 1314 (e.g., a mouse), a drive unit 1316, a signal generation device 1318 (e.g., a speaker) and a network interface device 1320.

The drive unit 1316 includes a machine-readable medium 1322 on which is stored one or more sets of instructions (e.g., software 1324) embodying any one or more of the methodologies or functions described herein. The software 1324 may also reside, completely or at least partially, within the main memory 1304 and/or within the processor 1312 during execution thereof by the computer system 1300, the main memory 1304 and the processor 1312 also constituting machine-readable media.

The software 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, and optical media, and magnetic media.

Certain systems, apparatus, applications or processes are described herein as including a number of modules. A module may be a unit of distinct functionality that may be presented in software, hardware, or combinations thereof. When the functionality of a module is performed in any part through software, the module includes a machine-readable medium. The modules may be regarded as being communicatively coupled.

The inventive subject matter may be represented in a variety of different embodiments of which there are many possible permutations.

In an example embodiment, a first portion of an audio signal may be encoded with a first dual-tone multi-frequency (DTMF) tone. A second portion of the audio signal may be encoded with a second DTMF tone at a time delay from the first DTMF tone. The second DTMF tone may be different than the first DTMF tone.

In an example embodiment, a two-tone encoding selection including a first DTMF tone and a second DTMF tone may be received. A fade effect may be applied to the first DTMF tone and the second DTMF tone to create a first faded DTMF tone and a faded second DTMF tone. A first portion of an audio signal may be encoded with the first faded DTMF. A second portion of the audio signal may be encoded with the second DTMF tone at a time delay from the first faded DTMF. The second faded DTMF tone may be different than the first faded DTMF tone and the time delay may be less than a quarter of a second.

In an example embodiment, a first DTMF tone in an audio signal may be identified and decoded. A second DTMF tone in the audio signal at a time delay from the first DTMF tone may be identified and decoded. The second DTMF tone may be different than the first DTMF tone. A requested action for an electronic figurine associated with the first DTMF tone and the second DTMF tone may be determined.

In an example embodiment, a first DTMF tone in an audio signal may be identified and decoded. A determination of whether a second DTMF tone is present in the audio signal at the time delay from the first DTMF tone may be made. The second DTMF tone may be different than the first DTMF tone. When a determination is made that the second DTMF tone is not present in the audio signal at the time delay from the first DTMF tone, an electronic figurine may be reset to receive a plurality of additional DTMF tones. A third DTMF tone in the audio signal may be identified and decoded. A determination of whether a fourth DTMF tone is present in the audio signal at the time delay from the first DTMF tone may be made. The fourth DTMF tone may be different than the third DTMF tone. When a determination is made that the fourth DTMF tone is present in the audio signal at the time delay from the third DTMF tone, the fourth DTMF tone may be decoded. A requested action associated with the third DTMF tone and the fourth DTMF tone may be determined for the electronic figurine.

In an example embodiment, a transmission of an encoded audio signal may be received at a frequency through a radio frequency receiver on a mobile electronic device. The encoded audio signal may be processed on the mobile electronic device to decode an encoded data trigger on a subcarrier of the frequency from the encoded audio signal. An additional audio signal may be audibly received through a microphone on the mobile electronic device. The encoded data trigger may be verified based on receipt of the additional audio signal. An action may be enabled on the mobile electronic device based on verification. The action may be performed on the mobile electronic device based on enablement of the action and the encoded data trigger.

Thus, methods and systems for encoding and decoding audio signals have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
    encoding a first portion of an audio signal with a first dual-tone multi-frequency (DTMF) tone;
    encoding a second portion of the audio signal with a second DTMF tone at a time delay from the first DTMF tone, the second DTMF tone being different than the first DTMF tone; and the method further comprising:
    receiving a two-tone encoding selection associated with an action on an electronic figurine, the two-tone encoding selection including the first DTMF tone and the second DTMF tone,
    wherein encoding the first portion and the second portion is in response to receiving the two-tone encoding selection.

2. The method of claim 1, further comprising:
    receiving a requested action for an electronic figurine; and
    identifying the first DTMF tone and the second DTMF tone based on the requested action,
    wherein the encoding of the first portion and the second portion is based on the identifying.

3. The method of claim 2, wherein the requested action includes an audio reproduction request for the electronic figurine.

4. The method of claim 2, wherein the requested action includes a motion request, a light request, or combinations thereof for the electronic figurine.

5. The method of claim 1, further comprising:
    applying a fade effect to the first DTMF tone and the second DTMF tone to create a first faded DTMF tone and a faded second DTMF tone,
    wherein the first portion of the audio signal is encoded with the first faded DTMF tone and the second portion of the audio signal is encoded with the faded second DTMF tone at the time delay.

6. The method of claim 5, wherein the fade effect includes a fade in and a fade out.

7. The method of claim 1, further comprising:
    applying an envelope effect to the first DTMF tone and the second DTMF tone to create an enveloped first DTMF tone and an enveloped second DTMF tone,
    wherein the first portion of the audio signal is encoded with the enveloped first DTMF tone and the second portion of the audio signal is encoded with the enveloped second DTMF tone at the time delay.

8. The method of claim 1, further comprising:
    encoding the audio signal with a third DTMF tone at the time delay from the second DTMF tone, the third DTMF tone being different than the second DTMF tone.

9. The method of claim 1, further comprising:
    selecting a portion of the audio signal for encoding the second DTMF tone based on underlying audio of the audio signal,
    wherein encoding of the second DTMF tone is based on selection of the portion.

10. The method of claim 1, wherein the time delay is less than a quarter of a second.

11. The method of claim 1, wherein a time duration of the first portion and the second portion are approximately equal.

12. A method comprising:
    identifying and decoding a first DTMF tone in an audio signal;
    identifying and decoding a second DTMF tone in the audio signal at a time delay from the first DTMF tone; and
    determining an action for an electronic figurine associated with the first DTMF tone and the second DTMF tone,
    wherein the second DTMF tone is different than the first DTMF tone;
    wherein identifying and decoding the second DTMF comprises:
    determining whether an additional DTMF tone is present in the audio signal at the time delay from the first DTMF tone; and
    decoding the additional DTMF tone as the second DTMF tone.

13. The method of claim 12, wherein determining the action comprises:
   comparing the first DTMF tone and the second DTMF tone to a plurality of paired tone entries of a lookup table; and
   identifying the action for the electronic figurine based on comparing.

14. The method of claim 12, wherein the time delay is less than a quarter of a second.

15. The method of claim 12, wherein a time duration of the first portion and the second portion are approximately equal.

16. The method of claim 12, wherein there is no DTMF tone in the audio signal after the first DTMF tone during the time delay.

17. A non-transitory machine-readable medium comprising computer-executable instructions, which when executed by one or more processors, cause the one or more processors to perform the following operations:
   identify and decode a first DTMF tone in an audio signal;
   identify and decode a second DTMF tone in the audio signal at a time delay from the first DTMF tone; and
   determine a requested action for an electronic figurine associated with the first DTMF tone and the second DTMF tone,
   wherein the second DTMF tone is different than the first DTMF tone;
   wherein identifying and decoding the second DTMF comprises:
      determining whether an additional DTMF tone is present in the audio signal at the time delay from the first DTMF tone; and
      decoding the additional DTMF tone as the second DTMF tone.

* * * * *